United States Patent
Lin et al.

(10) Patent No.: US 9,395,498 B2
(45) Date of Patent: Jul. 19, 2016

(54) OPTICAL FIBER CONNECTOR WITH OPTICAL FIBER HOLDER RECEIVED IN RJ45 PLUG

(71) Applicant: HON HAI PRECISION INDUSTRY CO., LTD., New Taipei (TW)

(72) Inventors: I-Thun Lin, New Taipei (TW); Chih-Chen Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/550,220

(22) Filed: Nov. 21, 2014

(65) Prior Publication Data

US 2015/0277058 A1    Oct. 1, 2015

(51) Int. Cl.
G02B 6/36 (2006.01)
G02B 6/38 (2006.01)
G02B 6/32 (2006.01)

(52) U.S. Cl.
CPC ............. *G02B 6/3825* (2013.01); *G02B 6/32* (2013.01); *G02B 6/3869* (2013.01)

(58) Field of Classification Search
CPC ................................................... G02B 6/3616
See application file for complete search history.

(56) References Cited

U.S. PATENT DOCUMENTS

| | | | | |
|---|---|---|---|---|
| 5,381,498 A * | 1/1995 | Bylander | ............. | G02B 6/3805 385/83 |
| 7,326,087 B2 * | 2/2008 | Gerlach | ............... | G02B 6/3817 385/53 |
| 7,488,115 B2 * | 2/2009 | Theis | .................... | G02B 6/3825 385/55 |
| 8,376,630 B2 * | 2/2013 | Wang | ................... | G02B 6/3817 385/139 |
| 8,794,850 B2 * | 8/2014 | Su | ......................... | G02B 6/3817 385/75 |
| 9,134,484 B2 * | 9/2015 | Wu | ...................... | G02B 6/3817 |
| 2008/0085082 A1 * | 4/2008 | Theis | ................... | G02B 6/3893 385/72 |
| 2011/0243505 A1 * | 10/2011 | Su | ......................... | G02B 6/3817 385/75 |
| 2011/0311187 A1 * | 12/2011 | Wang | ................... | G02B 6/3817 385/78 |
| 2012/0314999 A1 * | 12/2012 | Wu | ...................... | G02B 6/3821 385/77 |
| 2015/0277058 A1 * | 10/2015 | Lin | ...................... | G02B 6/3616 385/76 |

* cited by examiner

*Primary Examiner* — Rhonda Peace
(74) *Attorney, Agent, or Firm* — ScienBiziP, P.C.

(57) ABSTRACT

An optical fiber connector includes a housing, two coupling lenses, a RJ45 plug, a holder, and two optical fibers. The housing defines a receiving cavity with a bottom surface and two through holes. The coupling lens is positioned on the bottom surface and covers the through holes. The RJ45 plug is received in the receiving cavity and defines a receiving recess. The holder is received in the receiving recess and defines two receiving through holes. The optical fibers are received in the receiving through holes and optically aligned with the coupling lenses.

10 Claims, 4 Drawing Sheets

OPTICAL FIBER CONNECTOR WITH OPTICAL FIBER HOLDER RECEIVED IN RJ45 PLUG

FIELD

The subject matter herein generally relates to optical fiber connectors, and particularly to an optical fiber connector using a RJ45 plug receiving an optical fiber holder.

BACKGROUND

RJ45 connectors are generally applied to connect networks through copper lines. The copper lines cannot meet the requirement of high bandwidth transmission. Therefore optical fiber connectors and optical fibers are used to replace the RJ45 connectors and the copper lines and achieve high bandwidth transmission. However, replacing the RJ45 connectors with the optical fiber connectors has a high cost.

BRIEF DESCRIPTION OF THE DRAWINGS

Implementations of the present technology will now be described, by way of example only, with reference to the attached figures.

DETAILED DESCRIPTION

Figure 1:
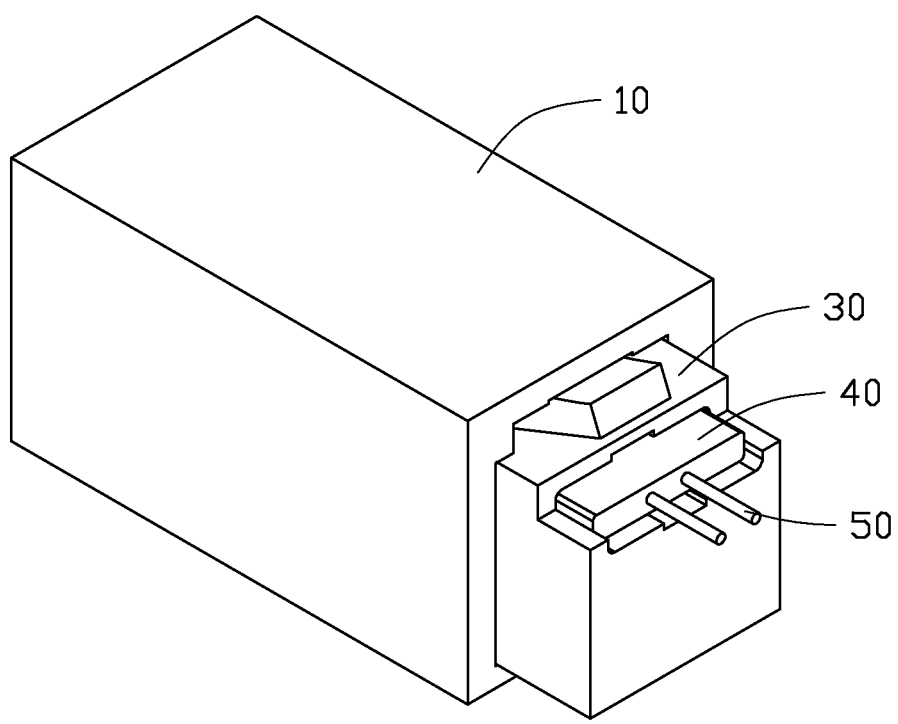
FIG. 1 is an assembled, isometric view illustrating an embodiment of an optical fiber connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
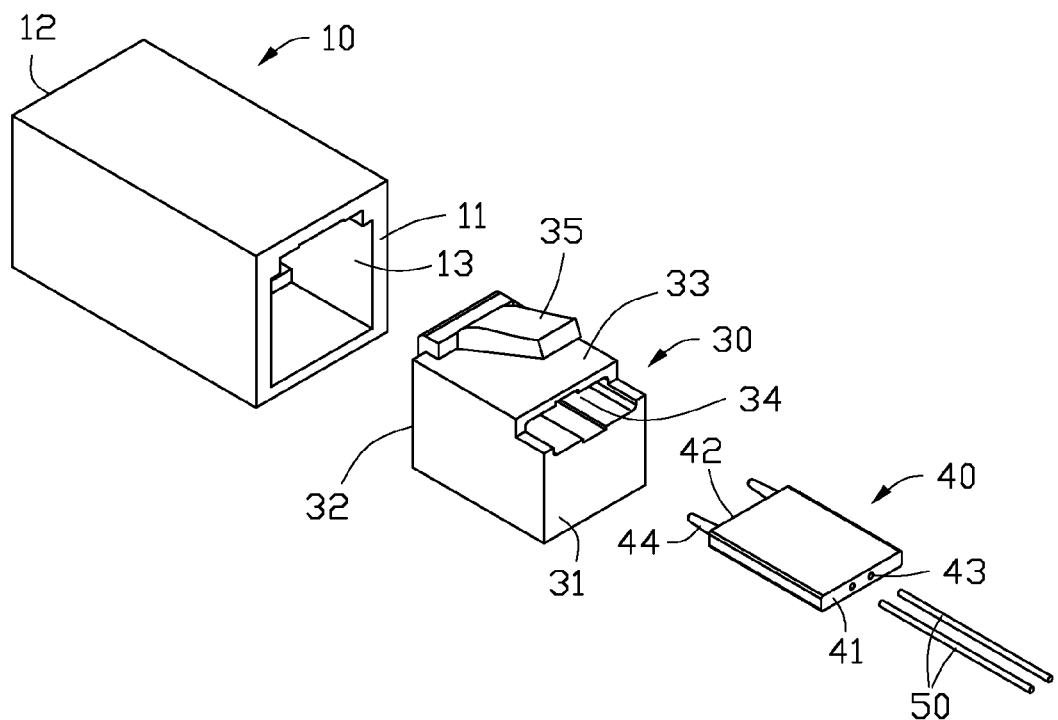
FIG. 2 is an exploded, isometric view illustrating the optical fiber connector of FIG. 1.

Referring to FIGS. 1-2, an embodiment of an optical fiber connector 100 includes a housing 10, four optical coupling lenses 20, a RJ45 plug 30, a holder 40, and two optical fibers 50.

The housing 10 is substantially rectangular shaped and includes a first sidewall 11 and a second sidewall 12 parallel to the first sidewall 11. The housing 10 defines a first receiving cavity 13 in the first sidewall 11 and a second receiving cavity 16 in the second sidewall 12. The first receiving cavity 13 includes a first bottom surface 131 parallel to the second sidewall 12 and defines two first positioning holes 15 in the first bottom surface 131. The second receiving cavity 16 includes a second bottom surface 161 parallel to the first bottom surface 131 and defines two second positioning holes 17 in the second bottom surface 161. The first positioning holes 15 and the second positioning holes 17 are all blind holes and a central line of each of the first positioning holes 15 and the second positioning holes 17 is perpendicular to the first bottom surface 131 and the second bottom surface 161. The housing 10 defines two through holes 14 running all the way through the first bottom surface 131 and the second bottom surface 161. A central line of each through hole 14 is perpendicular to the first bottom surface 131 and the second bottom surface 161.

Figure 3:
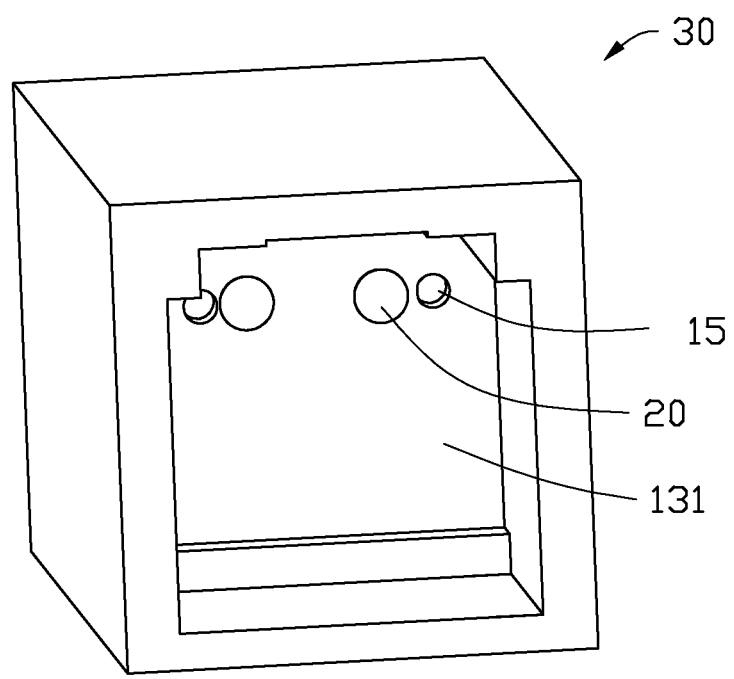
FIG. 3 is an isometric view illustrating a housing of the optical fiber connector of FIG. 1.
Figure 4:
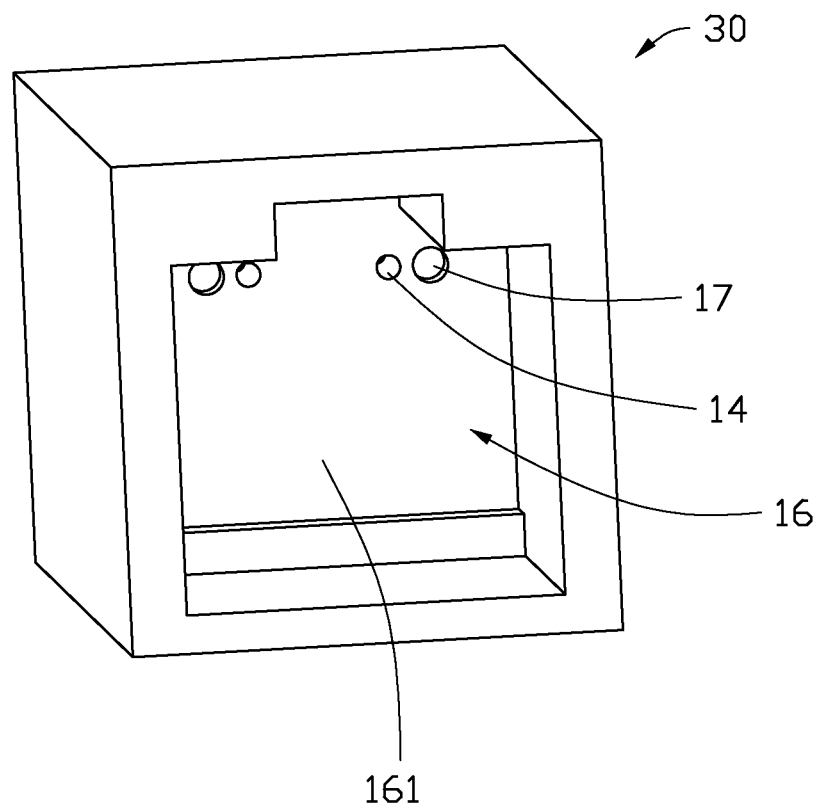
FIG. 4 is similar to FIG. 3, but viewed from another angle.

Referring also to FIGS. 3 and 4, the RJ45 plug 30 includes a first end surface 31, a second end surface 32, and a connecting surface 33. The connecting surface 33 is perpendicularly connected between the first end surface 31 and the second end surface 32. The RJ45 plug 30 defines a receiving recess 34 extending all the way through the first end surface 31 and the second end surface 32. An extending direction of the receiving recess 34 is perpendicular to the first end surface 31 and the second end surface 32. The RJ45 plug 30 includes an elastic wing 35. One end of the elastic wing 35 is positioned on the connecting surface 33 and close to an intersection of the first end surface 31 and the connecting surface 33. The elastic wing 35 is inclined to the connecting surface 33 and an acute angle is formed between the elastic wing 35 and the connecting surface 33.

The holder 40 is substantially rectangular shaped and includes a first outer surface 41 and a second outer surface 42 parallel to the first outer surface 41. The holder 40 defines two receiving through holes 43 running all the way through the first outer surface 41 and the second outer surface 42. A central line of each receiving through hole 43 is perpendicular to the first outer surface 41 and the second outer surface 42. The holder 40 includes two positioning poles 44 on the second outer surface 42 corresponding the positioning holes 15 in position. The two positioning poles 44 are perpendicular to the second outer surface 42.

Two of the four coupling lenses 20 are positioned on the first bottom surface 131 and covers the through holes 14. The other two coupling lenses 20 are positioned on the second bottom surface 161 and also cover the through holes 14. A central line of each of the four coupling lenses 20 is coaxial to the central line of a corresponding one of the through holes 14. The four coupling lenses 20 are all aspherical lenses.

In assembly, the RJ45 plug 30 is received in the first receiving cavity 13. The elastic wing 35 is received and compressed in the first receiving cavity 13 to assure a stable connection between the RJ45 plug 30 and the housing 10. The holder 40 is received in the receiving recess 34. The two positioning poles 44 are inserted into the two positioning holes 15 correspondingly, such that a central line of each receiving through hole 43 is coaxial to the central line of a corresponding one of the through holes 14. The two optical fibers 50 are received in the receiving through holes 43 and optically aligned with the coupling lenses 20.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size and arrangement of the parts within the principles of the present disclosure up to, and including, the full extent established by the broad general meaning of the terms used in the claims.

What is claimed is:

1. An optical fiber connector comprising:
    a housing comprising a first sidewall, the housing defining a first receiving cavity in the first sidewall, the first receiving cavity comprising a first bottom surface parallel to the first sidewall, the housing defining two through holes running all the way through the first bottom surface;
    two first coupling lenses directly positioned on the first bottom surface, each of the two first coupling lenses totally covering a respective one of the two through holes;
    a RJ45 plug received in the first receiving cavity, the RJ45 plug comprising a first end surface and a second end surface opposite to the first end surface, the RJ45 plug defining a receiving recess extending all the way through the first end surface and the second end surface;
    a holder received in the receiving recess, the holder comprising a first outer surface and a second outer surface opposite to the first outer surface, the holder defining two receiving through holes running all the way through the first outer surface and the second outer surface; and
    two optical fibers, each of the two optical fibers received in a respective one of the two receiving through holes and optically aligned with a respective one of the two coupling lenses.

2. The optical fiber connector of claim 1, wherein the housing defines a first positioning hole in the first bottom surface, the holder comprises a positioning pole on the second outer surface, and the positioning pole is received in the first positioning hole.

3. The optical fiber connector of claim 2, wherein the housing comprises a second sidewall parallel to the first sidewall.

4. The optical fiber connector of claim 3, wherein the housing defines a second receiving cavity in the second sidewall, the second receiving cavity comprises a second bottom surface parallel to the first sidewall, the housing defines a second positioning hole in the second bottom surface, and the two through holes runs all the way through the first and second bottom surfaces.

5. The optical fiber connector of claim 4, wherein the first and second positioning holes are all blind holes.

6. The optical fiber connector of claim 4, wherein the optical fiber connector comprises two second coupling lenses positioned on the second bottom surface and each of the two second coupling lenses covers a respective one of the two through holes.

7. The optical fiber connector of claim 4, wherein a central line of the first positioning hole is perpendicular to the first sidewall and the positioning pole is perpendicular to the second outer surface.

8. The optical fiber connector of claim 1, wherein the RJ45 plug comprises a connecting surface and an elastic wing, the connecting surface is connecting between the first end surface and the second end surface, one end of the elastic wing is positioned on the connecting surface, and the elastic wing is received and compressed in the first receiving cavity.

9. The optical fiber connector of claim 8, wherein the elastic wing is inclined to the connecting surface and an acute angle is formed between the elastic wing and the connecting surface.

10. The optical fiber connector of claim 1, wherein an extending direction of the receiving recess is perpendicular to the first end surface and the second end surface.

\* \* \* \* \*